United States Patent [19]
Ball et al.

[11] 3,792,762
[45] Feb. 19, 1974

[54] THROTTLE OVERRIDE CONTROLLED BY A VACUUM BOOSTED POWER BRAKING SYSTEM

[75] Inventors: Frank W. Ball; Harold L. Howard, both of Lansing, Mich.

[73] Assignee: General Motors Corporation, Detroit, Mich.

[22] Filed: Dec. 11, 1972

[21] Appl. No.: 313,779

[52] U.S. Cl............................... 192/3 M, 192/3 R
[51] Int. Cl....................... F16d 67/00, F16d 71/00
[58] Field of Search.......... 192/3 R, 3 T, 3 M, 3 TR

[56] References Cited
UNITED STATES PATENTS

| | | | |
|---|---|---|---|
| 3,495,692 | 2/1970 | Holgate | 192/3 R |
| 2,911,078 | 11/1959 | Baker | 192/3 R |
| 2,311,120 | 2/1943 | Mossinghoff | 192/3 R |
| 2,066,667 | 1/1937 | Bellis | 192/3 T X |

*Primary Examiner*—Benjamin W. Wyche
*Assistant Examiner*—Lance W. Chandler
*Attorney, Agent, or Firm*—Arthur N. Krein

[57] ABSTRACT

A throttle override system for a conventional throttle controlled internal combustion engine wherein an additional valve is positioned in the engine air induction passage and is normally held open by a spring and is closed by operation, above a predetermined force, of the vacuum boosted power braking system of the vehicle to thereby control the airflow through the induction passage.

4 Claims, 5 Drawing Figures

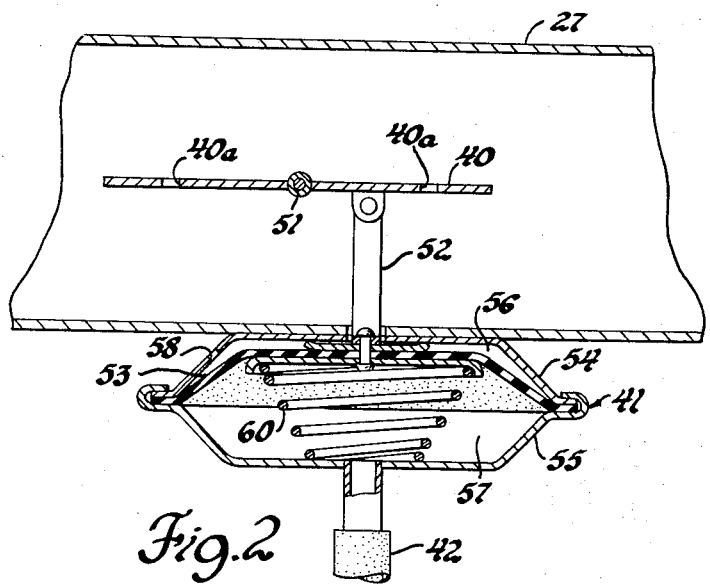
Fig.2
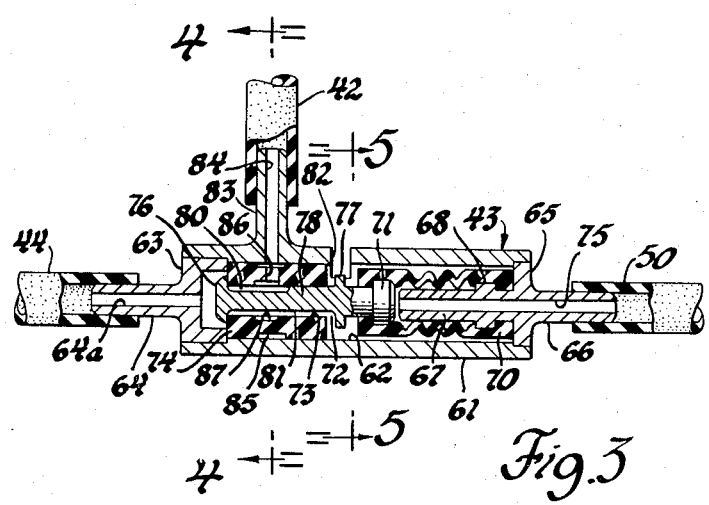
Fig.3
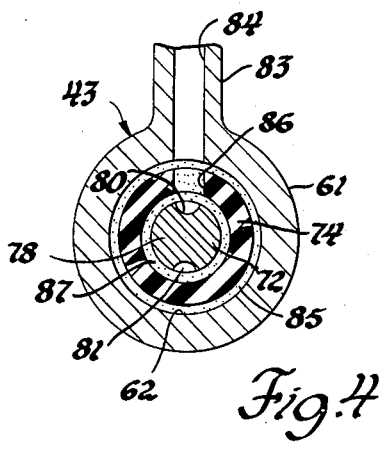
Fig.4
Fig.5

THROTTLE OVERRIDE CONTROLLED BY A VACUUM BOOSTED POWER BRAKING SYSTEM

The present invention relates to a throttle control for an internal combustion engine and more particularly to a throttle override mechanism for a vehicle to control the flow of air to the engine as a function of brake actuation.

During normal vehicle operation, it is customary to decelerate the engine before effecting vehicle braking but, under certain conditions, this is not always possible. There may therefore be times when the throttle may not be returned to an idle position before vehicle braking is required and, under these conditions, the engine will still be operating to power the vehicle forward at the same time the operator is attempting to brake the vehicle to a stop. This latter condition will frequently occur, for example, with drivers who use their left foot for braking since their right foot may still be on the accelerator pedal holding the throttle valve open as they attempt to brake with their left foot.

It is, therefore, an object of this invention to provide a throttle override system for the internal combustion engine of a vehicle which is operable upon vehicle braking to control the airflow to the engine in lieu of this airflow being controlled by the throttle valve of the carburetor of the engine.

It is another object of this invention to provide an air control system for the internal combustion engine of a vehicle wherein, in addition to the primary throttle valve for normally controlling the airflow through the air induction passage to the engine, a secondary flow valve in the air passage to the engine is operatively connected to and closed by actuation of the vacuum boosted power braking system of the vehicle.

It is a further object to provide an airflow control system of the foregoing type wherein the secondary airflow valve is power actuated by a vacuum motor selectively connected by a control valve to communicate with either an engine vacuum accumulator or with the atmosphere, the control valve being actuated by the air valve of the vacuum boosted power braking system of the vehicle.

These and other objects of the present invention are obtained by means of a secondary airflow control valve positioned in the air induction passage of the internal combustion engine of a vehicle upstream of the primary throttle valve of the internally vented carburetor of the engine. The secondary airflow valve is normally spring-biased to an open position, and is closed by a vacuum motor when connected by a control valve, actuated pneumatically by the vacuum booster unit of the vacuum boosted power braking system of the vehicle, to a source of engine vacuum.

For a better understanding of the invention, as well as other objects and further features thereof, reference is had to the following detailed description taken in conjunction with the accompanying drawings, wherein:

FIG. 2 is a sectional view of the airflow control valve and its power actuator of the throttle override system of FIG. 1;

FIG. 3 is a view in cross section of the control valve of the throttle override system of FIG. 1;

FIG. 4 is a view of the control valve taken along line 4—4 of FIG. 3; and,

FIG. 5 is a view of the control valve taken along line 5—5 of FIG. 3.

Figure 1:
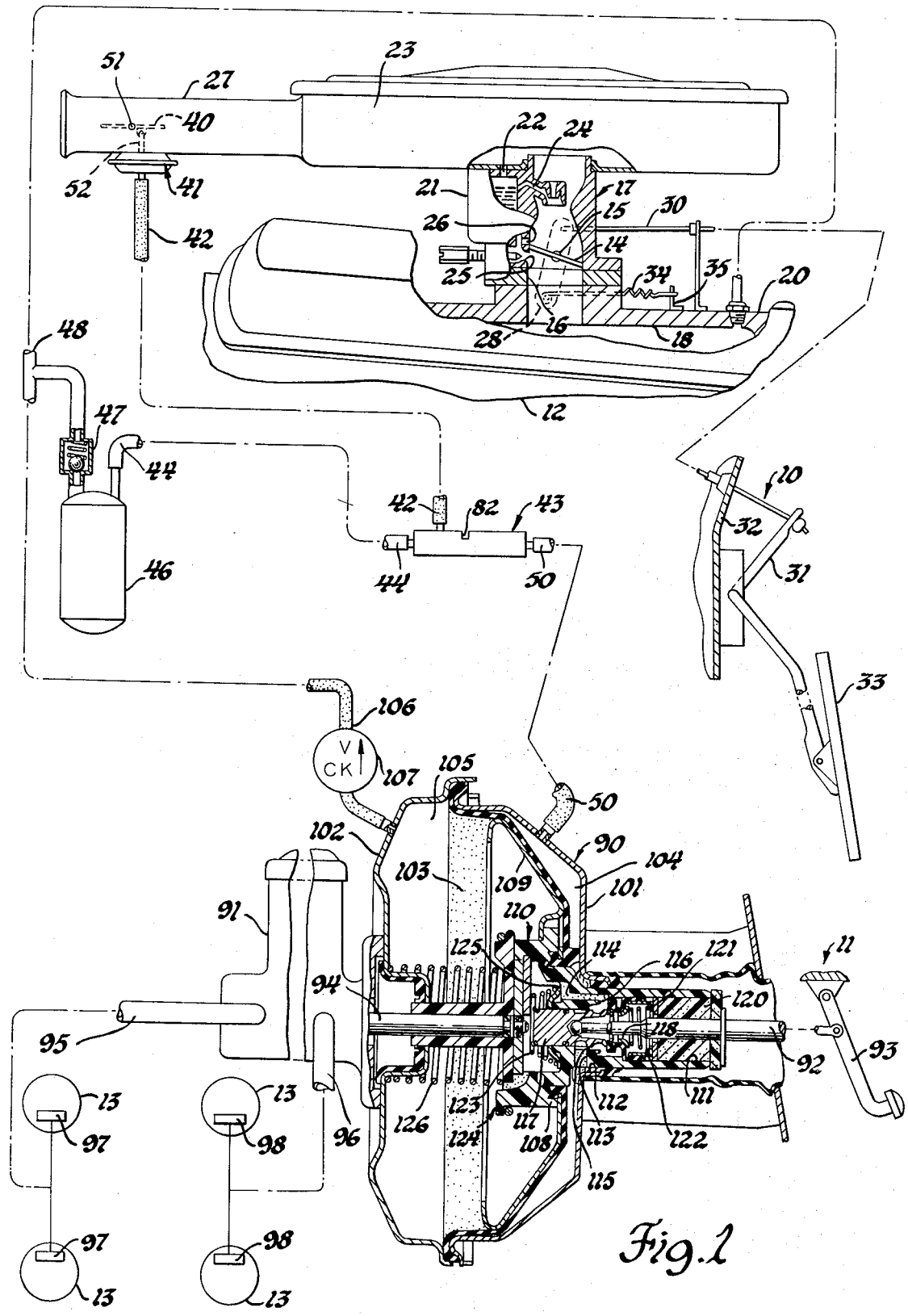
FIG. 1 is a view, partially in schematic and partially in cross section with parts broken away, of a vehicle throttle override system provided in accordance with the present invention.

With reference now to FIG. 1, there is shown a vehicle throttle pedal linkage 10 and a vehicle braking system 11 for respectively permitting an operator of a vehicle to control the internal combustion engine 12 of the vehicle and to brake the set of vehicle wheels 13.

Throttle pedal linkage 10 includes a primary throttle valve 14 that is fixed to a throttle shaft 15 pivotable in the throttle bore 16 of a carburetor 17, throttle valve 14 being normally controlled by the vehicle operator to regulate the delivery of an air-fuel flow to the induction passage 18 in the intake manifold 20 of engine 12. Carburetor 17 includes a float bowl 21, internally vented by a vent 22 to the airflow through the interior of an air cleaner 23, operative to provide, through primary fuel delivery passage 24 and idle port 25 and off-idle port 26, a fuel flow mixed in throttle bore 16 with air admitted through air intake 27 of air cleaner 23. Throttle shaft 15 is pivoted by a throttle lever 28 that is connected by a sheathed throttle cable 30 to a pedal lever 31 pivotably supported on the vehicle firewall 32. Suspended from vehicle firewall 32 by pedal lever 31 is a vehicle throttle pedal 33 which, with an actuating force applied thereto, is operative to pivot throttle valve 14 in a clockwise opening direction from an idle position to a full-open position. A return spring 34 is connected between throttle lever 28 and an engine mounted bracket 35 to normally return throttle valve 14 to its idle position upon removal of actuating force from vehicle throttle pedal 33.

Referring now to the subject matter of the present invention, there is provided a secondary airflow valve 40 pivotally mounted in the air intake 27 of air cleaner 23 to be moved by a differential fluid pressure operated motor, which in the embodiment disclosed is a vacuum motor 41, between an open position in which airflow to the engine is controlled in a normal manner by the throttle valve 14 and, a closed position in which airflow to the engine is controlled by this valve regardless of the position of throttle valve 14.

Vacuum motor 41 is connected by conduit 42 to a differential fluid pressure actuated control valve 43 whereby the variable pressure chamber of the vacuum motor can be placed in communication either with a source of vacuum pressure or with the atmosphere. As shown, vacuum motor 41 is connected through control valve 43 and conduit 44 to a vacuum accumulator 46 that is connected through check valve 47 and conduit 48 to the induction passage 18 in the intake manifold 20 of the engine. Control valve 43 is actuated by having its actuating mechanism, to be described hereinafter, connected by a conduit 50 to the vacuum booster unit of the vehicle brake system 11 whereby, in a manner to be described, operation of the vehicle brake system is used to effect closing of the valve 40.

With reference to FIG. 2, valve 40 is supported inside air intake 27 by a valve shaft 51 journalled in the air intake whereby the valve 40 can be moved between the open position, as shown in the drawings, and a closed position. Valve 40 is pivotably connected by an actuator rod 52 to the diaphragm 53 of vacuum motor 41. Vacuum motor 41 comprises a housing formed by two generally cup-shaped upper and lower halves 54 and 55, respectively, with the periphery of diaphragm 52 being sealingly secured therebetween to define an upper chamber 56 and a lower or variable pressure chamber 57, with the upper chamber 56 being vented to the atmosphere through an aperture 58 in upper housing half 54. A spring 60 is positioned in lower chamber 57 abutting at one end against lower housing half 55 and at its other end against diaphragm 53 to normally bias diaphragm 53 in one direction, upward as shown in FIG. 2, to normally move valve 40 to the open position, as shown.

To permit engine idling when the valve 40 is closed, clearance can be provided between valve 40 and the interior wall of air intake 27 to provide for suitable airflow, or as shown, the valve 40 can be provided with flow apertures 40a of the desired size for the flow of sufficient air to engine 12 to maintain its operation at an idling speed.

Referring now to FIGS. 3, 4 and 5, the control valve 43 includes a tubular body 61 having a stepped bore 62 therethrough with one end or left end of the body, with reference to FIG. 3, being partly closed by an end cap 63 fixed to the body and having an axial outward extending nipple 64 with a passage 64a therethrough. The other end or right end of the tubular body 61 is partly closed by an end cap 65 fixed thereto and having an axial outward extending nipple 66 and an inward extending bellows support tube portion 67 with an annular flange 68 intermediate the ends thereof, the tube portion 67 and flange 68 being positioned concentrically within bore 62.

A tubular bellows 70 is positioned within the bore 62 of body 61 at one end thereof, the right end as seen in FIG. 3, to encircle the tube portion 67 of the end cap 65, with one end of the bellows sealingly secured around the annular flange 68 of the tube portion 67 and the opposite end of the bellows being sealingly secured to the enlarged flanged end 71 of a valve element 72 slidably received in the bore 73 of a double-ended tubular valve seat 74 secured in the opposite end of bore 62 in body 61 from bellows 70 with a sufficient space therebetween to permit for the axial expansion and contraction of the bellows 70.

To effect this expansion and contraction of bellows 70, the end cap 65 is provided with an axial bore to form passage 75 extending through the tube portion 67 and nipple 66 so that the interior of bellows 70 is in fluid flow relationship with the conduit 50 connected to the nipple 66 on the end cap of the control valve 43.

The valve element 72 is provided at its opposite end from enlarged flanged end 71 with a radial flange 76 and, spaced axially from this flange 76 a distance greater than the axial length of the valve seat 74, is a second radial flange 77 that is thus located intermediate the enlarged flanged end 71 and the flange 76 of valve element 72. The shaft portion 78 of the valve element 72 between the flanges 76 and 77 is of a size and configuration to be slidably received within bore 73 of the valve seat 74 and is provided with axial slots or grooves 80 and 81 in the outer periphery thereof with at least the slot 81 extending the full axial distance between these flanges. With this arrangement, valve element 72 can move from the position shown in FIG. 3 wherein the shoulder of flange 76 is seated against the left end of valve seat 74 and the flange 77 is unseated from the right end of valve seat 74, leftward to a position in which flange 77 is seated against the right end of valve seat 74 while flange 76 is unseated from the left end of valve seat 74, flange 76 in this position extending into the enlarged bore within end cap 63.

The valve body 61 is also provided with a radial slot 82 extending through the wall thereof into bore 62 between the bellows 70 and the right-hand end of valve seat 74 and, with a radial, outward extending, nipple 83 connected to conduit 42. Nipple 83 is provided with a through passage 84 therein aligned in fluid flow relationship to an annular groove 85 in the outer periphery of valve seat 74 intermediate the ends thereof. Annular groove 85 is connected by one or more radial passages 86 in valve seat 74 to an annular groove 87 in the periphery of bore 73 of the valve seat to provide fluid flow between the conduit 42 and the slots 80 and 81 in the valve element 72, slot 80 being of a suitable length to be in fluid flow relationship with groove 87 when valve element is moved to the left from the position shown in FIG. 3.

Operation of the control valve 43 and therefore of the vacuum motor 41 to position valve 40 is controlled by operation of the vehicle braking system 11 whereby during normal vehicle operation, with the vehicle braking system in its released position, the valve 40 is maintained in the open position so that the operator has control of the engine operation in a conventional manner by actuation of the throttle valve 14. However, when the operator actuates the vehicle braking system with a predetermined applied brake pedal pressure, the control valve 43 is actuated to operate vacuum motor 41 so that the valve 40 is moved to a closed position to thus limit airflow to the engine so that it can only operate at a predetermined idling speed thus overriding control of engine operation by throttle valve 14.

As shown in FIG. 1, this is accomplished by a conventional vehicle braking system 11 of the type having a power brake unit of the combined vacuum and hydraulic unit type which utilizes engine intake manifold vacuum and atmospheric pressure to provide power assisted application of the vehicle brakes. This type of power brake unit is composed of two main sections, a vacuum power cylinder or booster 90 and a hydraulic master cylinder assembly 91.

Vacuum booster 90 may be either of the conventional double diaphragm type or, as shown, a conventional single diaphragm type, such as disclosed in the U.S. Pat. No. 3,249,021, issued May 3, 1966, to Clarence R. Wuellner, and entitled "Power Brake Booster." With reference to FIG. 1, vacuum booster 90 has a push rod 92 pivotably connected to the vehicle brake pedal 93 and has a piston rod 94 extending into the hydraulic master cylinder assembly 91 which is connected by front and rear brake lines 95 and 96, respectively, to the front and rear brakes 97 and 98, respectively, to pump hydraulic pressure fluid thereto upon actuation of the vehicle brake pedal 93.

Vacuum booster 90 comprises a housing formed by generally cup-shaped right and left housing parts 101 and 102, respectively, separated by a centrally apertured disphragm 103 into the right or variable pressure chamber 104 and the left chamber 105, with reference to FIG. 1. Right chamber 104 is selectively connected, so to be hereinbelow described, to either left chamber 105 or to the atmosphere and is hereinafter called the variable pressure chamber 104. The left chamber 105 is connected by a conduit 106 with a one-way check valve 107 therein to communicate with conduit 48 and therethrough with the engine vacuum provided at induction passage 18 and is hereinafter called the vacuum chamber 105. The outer periphery of diaphragm 103 is sealingly connected between the right and left housing parts 101 and 102 and the inner periphery of diaphragm 103 is sealingly connected to the radial flange 108 of a tubular-shaped power piston 110 having a centrally located stepped bore 111 therethrough, one end of power piston 110 being of a reduced diameter to be reciprocally received in a central aperture 112 of right housing part 101. A dish-shaped support plate 109 is connected to the power piston flange 108 on the left side of diaphragm 103 for movement therewith. The diaphragm 103, support plate 109 and power piston 110 form a power piston assembly that is movable as a unit within the vacuum booster housing.

Power piston 110 is also provided with one or more radial passages 113 extending through the tubular wall thereof and with one or more axial passages 114, only one radial passage 113 being shown located 90° from its actual position and only one axial passage 114 being shown. Each radial passage 113 communicates with an axial slot 115 in stepped bore 111 and the variable pressure chamber 104. Each axial passage 114 communicates at one end with the portion of stepped bore 111 outboard of an annular shoulder 116 located between the enlarged and reduced diameter portions of stepped bore 111 and at its other end with the vacuum chamber 105 through the enlarged left-hand bore end of power piston 110.

Reciprocably received in the reduced diameter portion of stepped bore 111 is an air valve seat member 117 that cooperates with an annular centrally apertured floating air valve 118 to provide an air valve for selectively connecting variable pressure chamber 104 to communicate with the atmosphere or with the vacuum chamber 105.

As described in greater detail in the hereinabove referenced U.S. Pat. No. 3,249,021 to Wuellner, floating air valve 118 is positioned concentrically about push rod 92 and provides thereabout a central passage, the right end of which communicates with the atmosphere through an annular filter 120 in the hub of the power piston and the left end of which is normally seated against the right end of air valve seat member 117. The right end of floating air valve 118 is sealingly retained in the enlarged diameter portion of stepped bore 111 and the left end of floating air valve 118 is biased leftwardly by a floating air valve spring 121 from a spring retainer 122 to normally seat on the right end of air valve seat member 117, thereby normally blocking communication between the variable pressure chamber 104 and the atmosphere.

An air valve spring 123 is positioned between the right end of the reaction assembly 124, which includes piston rod 94, carried in the enlarged diameter portion of power piston 110 and a spring retainer cup 125 suitably secured to the left end of air valve seat member 117 to normally bias the air valve seat member 117, to the right as seen in FIG. 1, into seating relationship with the floating air valve 118. A power piston return spring 126 encircles the piston rod 94 within the vacuum chamber 105 to normally bias the power piston to the right to the position shown in FIG. 1 wherein the power piston engages against the housing part 101. This is the position of the above-identified elements with the brake system in its released position, that is, with no braking pedal pressure being applied to brake pedal 93.

In the released position of the brake system, as shown in FIG. 1, the air valve seat member 117 is seated against floating air valve 118. The flow of air under atmospheric pressure, which enters through the filter 120 is blocked at the air valve seat member 117 which is seated against the floating air valve 118. In this position, the floating air valve 118 is held away from the valve seat formed by annular shoulder 116 in the power piston 110. Vacuum which is present at all times in vacuum chamber 105 is free to evacuate the variable pressure chamber 104 with flow therefrom being through radial passage 113, axial slot 115, the passage between shoulder 116 of the power piston and the floating air valve 118 and then through the axial passage 114 in the power piston.

At the same time, vacuum in the variable pressure chamber 104 is applied through conduit 50 to the interior of bellows 70 of the control valve 43 to pull the valve element 72 to the right, to the position shown in FIG. 3. With the valve element 72 in this position, air at atmospheric pressure is free to flow through radial slot 82 into the bore 62 of valve body 61, then through axial slot 81, groove 87, passage 86, groove 85 and passage 84 in the control valve and then through conduit 42 into the variable pressure chamber 57 of vacuum motor 41. With atmospheric pressure now present on both sides of the diaphragm 53 of this motor, the spring 60 will force the diaphragm and actuator rod 52 upward to hold valve 40 in the open position as shown in FIGS. 1 and 2. Thus, whenever the brake system is returned to or is in a released position, the valve 40 will be held in the open position.

When the vehicle operator applies the brakes by actuation of the brake pedal 93, the push rod 92 is moved to the left with reference to FIG. 1 to carry with it the air valve seat member 117. With such leftward movement of air valve seat member 117, the floating air valve 118 is biased leftwardly by floating air valve spring 121 to follow the air valve seat member 117 until the floating air valve 118 seats on shoulder 116 to block communication between the variable pressure chamber 104 and the vacuum chamber 105 by closing off flow through axial passages 114. After the floating air valve 118 is stopped by shoulder 116 from following leftward movement of air valve seat member 117, the air valve seat member 117 is unseated from the floating air valve 118 to provide a passage therebetween that connects the variable pressure chamber 104 to communicate with the atmosphere through radial passages 113, axial slots 115, the central aperture in floating air valve 118, the enlarged diameter portion of stepped bore 111, and air filter 120. Since vacuum chamber 105 is connected to communicate with engine vacuum provided in induction passage 18 of engine 12, this allows a leftwardly acting pressure differential to be created on the opposite sides of diaphragm 103 with the pressure in the variable pressure chamber 104 approaching atmospheric pressure upon the application of a predetermined force applied to brake pedal 93. This pressure differential causes diaphragm 103, power piston 110 and support plate 109 to move to the left from the position shown in FIG. 1, thereby effecting a corresponding leftward movement of reaction assembly 124 and its piston rod 94 to effect vehicle braking.

When a desired pedal pressure is reached, the power piston 110 has moved to the left sufficiently until the floating air valve 118, which is still seated against shoulder 116, again seats on the air valve seat member 117. Seating of the floating air valve on the air valve seat member shuts off the flow of air at atmospheric pressure and seals the reduced vacuum level in the variable pressure chamber which provides the power assist as this pressure acts against the diaphragm and power piston. The elements of the power brake unit are now in the holding position and will then remain in this relationship to each other until either pressure is applied or released at the brake pedal 93.

As the pressure in variable pressure chamber 104 increases to atmospheric pressure which will occur when the brake pedal is actuated with at least a predetermined force, this air under pressure will flow from this chamber through conduit 50 into the interior of bellows 70 of control valve 43 to effect the normal extension of the bellows to move valve element 72 to the left from the position shown in FIG. 3, with a differential fluid pressure also acting on the flanges 76 and 77 of the valve element to effect this leftward movement of the valve element 72 until the flange 77 seats against the valve seat 74 with flange 76 now unseated. The variable pressure chamber 57 of vacuum motor 41 is then subject to vacuum pressure via conduit 42, the control valve 43 and conduit 44 with the accumulator 46 so that the diaphragm 55 of this unit moves downward from its position shown in FIG. 2 to move actuator rod 52 downward and thereby affecting movement of the valve 40 to the closed position. As long as the brake pedal pressure, above a predetermined value, is applied, vacuum motor 41 will hold the valve 40 in the closed position in the manner described. With valve 40 held in the closed position, airflow to the engine is restricted, irrespective of the position of throttle valve 14, to a predetermined flow rate so that the operation of the engine will be reduced to an idle speed mode of operation with adequate fuel flowing from the idle port 25 and off-idle port 26 of the carburetor to maintain engine operation at this reduced operating speed.

Upon removal of actuating force from vehicle brake pedal 93, power piston 110 and air valve seat member 117 are returned rightwardly to their nonactuated or released positions, as previously described, by the power piston return spring 126 and air valve spring 123, respectively, thereby re-establishing the normal communication between the variable pressure chamber 104 and the vacuum chamber 105 while blocking communication between the variable pressure chmaber 104 and the atmosphere so that vacuum is again applied in variable pressure chamber 104. As this occurs, vacuum is again applied to the interior of bellows 70 of the control valve 43 to shift the valve element 72 thereof back to the position shown in FIG. 3 to permit the flow of air at atmospheric pressure into the variable pressure chamber 57 of the vacuum motor 41. As this occurs, spring 60 of the vacuum motor 41 will effect movement of the valve 40 back to its normally open position with engine operation then controlled by throttle valve 14.

Having described one embodiment of the present invention, it is understood that the specific terms and examples are employed in a descriptive sense only and not for the purpose of limitation. Other embodiments of the invention, modifications thereof, and alternatives thereto may be used. We therefore aim in the appended claims to cover such modifications and changes as are within the true spirit and scope of our invention.

What we claim as new and desire to secure by Letters Patent of the United States is:

1. In a vehicle including an internal combustion engine providing a source of engine vacuum and having an air induction passage, an operator controlled primary throttle valve pivotably mounted in the air induction passage to normally regulate an air-fuel flow to the engine; and a vacuum boosted power braking system including a brake pedal, hydraulic pump means hydraulically connected to the set of vehicle wheel brakes, and a vacuum booster unit, the vacuum booster unit having first and second pressure chambers and air valve means actuatable by the actuation of the brake pedal, the first chamber connected to the source of engine vacuum and the second chamber selectively connectable by the air valve means to either the first chamber when the brake pedal is not actuated or to the atmosphere when the brake pedal is actuated:

a. secondary valve means pivotably mounted in the air induction passage upstream of the primary throttle valve for movement between an open position and a closed position;

b. differential fluid pressure actuated power means including at least one chamber and connected to the secondary valve means to effect movement thereof from said open position to said closed position when said one chamber is connected to communicate with the source of engine vacuum and alternatively to effect movement of said secondary valve means from said closed position to said open position when said one chamber is connected to communicate with the atmosphere; and, c. valve controlled conduit means including a pneumatic pressure responsive valve normally connecting said first chamber of said differential fluid pressure actuated power means to communicate with the atmosphere and operable to connect said first chamber of said differential fluid pressure actuated power means to communicate with said source of engine vacuum when said pneumatic pressure responsive valve is actuated, said pneumatic pressure responsive valve being operatively connected to the second chamber of said vacuum booster unit.

2. In a vehicle according to claim 1, wherein said differential fluid pressure actuated power means further includes a diaphragm to form said first chamber and a second chamber, said second chamber being in communication with the atmosphere and being separated from said first chamber by said diaphragm which is operatively connected to said secondary air valve to effect movement thereof from said open position to said closed position upon application of said engine vacuum to said first chamber, and a spring operatively connected to said air valve to effect movement thereof from said closed position to said open position when said first chamber is in communication with the atmosphere.

3. In a vehicle according to claim 1, wherein said valve controlled conduit means further includes engine vacuum accumulator means operatively connecting the source of engine vacuum and said pneumatic pressure responsive valve.

4. In a vehicle having an internal combustion engine providing a source of engine vacuum; a carburetor having an air induction passage, an operator controlled throttle valve for normally regulating the air-fuel flow to the engine; an air cleaner having an air intake passage mounted on the carburetor for delivering clean air to the air induction passage; and a vacuum boosted power braking system including a brake pedal, hydraulic pump means hydraulically connected to a set of wheel brakes, and a vacuum booster unit having first and second chambers and air valve means actuatable upon actuation of the brake pedal, the first chamber connected to a source of engine vacuum and the second chamber selectively connected by the air valve means to communicate with the first chamber when the brake pedal is not actuated and with the atmosphere when the brake pedal is actuated:

a. a secondary valve mounted in the air intake passage of the air cleaner for movement between an open position allowing a normal air delivery to the engine and an airflow reducing position for restricting the airflow to the engine;

b. differential fluid pressure actuated power means including first and second chambers, said differential fluid pressure actuated power means operatively connected to said secondary valve to effect movement thereof between said open position and said airflow reducing position;

c. engine vacuum accumulator means;

d. first conduit means operatively connecting said accumulator means and the source of engine vacuum;

and, e. valve controlled conduit means having a pneumatic pressure responsive valve including a valve means and a pressure responsive valve actuator means connected to said valve means, said valve means being operatively connected with the atmosphere, with said first chamber of said differential fluid pressure actuated power means, and with said engine vacuum accumulator means and said pressure responsive valve actuator means being operatively connected to the second chamber of the vacuum booster unit and being operable to actuate said valve means to place said first chamber of said differential fluid pressure actuated power means in communication with the atmosphere to normally hold said secondary valve in said open position when said brake pedal is not actuated and to place said first chamber of said differential fluid pressure actuated power means in communication with said engine vacuum accumulator means to effect movement of said secondary valve from said open position to said airflow reducing position when said vehicle brake pedal is actuated with a predetermined braking effort.

* * * * *